UNITED STATES PATENT OFFICE.

EDWARD KOKOSINSKI, OF PARIS, FRANCE.

IMPROVEMENT IN THE MANUFACTURE OF BEER.

Specification forming part of Letters Patent No. 222,507, dated December 9, 1879; application filed October 2, 1879.

*To all whom it may concern:*

Be it known that I, EDWARD KOKOSINSKI, of Paris, France, have invented a new and useful Improvement in the Manufacture of Beer, of which the following is a full, clear, and exact description.

The object of my invention is to manufacture a beer which will possess special nutritive and hygienic qualities; and this object I attain by employing whey in place of the water usually used in the manufacture of ordinary beer, as more fully described hereinafter.

To make my improved beer or milk-beer, I use the following proportions of ingredients, namely: thirty-three kilograms of malt, one hundred and fifty liters of whey, and sixty grams of hops, preferably Bohemian hops.

The whey should be freshly prepared and be free from lactic fermentation and lactic acid.

In brewing, a thick wort is used, and the fermentation is conducted at a low temperature, the steps of the brewing process being otherwise the same as in brewing ordinary beer. A brewing of the above quantities of materials will produce about a hectoliter of my improved beer.

The use of whey in place of the water in ordinary beer results in imparting to the beer a greater quantity of albuminous matter and salts which the milk contains, and which are identical with the salts of the blood, and thus renders the beer very nutritious.

If desired, medicines—such as quinine, tar, iron, &c., may be incorporated in the milk-beer during its manufacture.

I claim as my invention—

1. The process herein described, of making milk-beer by brewing together malt, whey, and hops, substantially in the manner set forth.

2. The within described milk-beer, composed of an extract or solution of malt, whey, and hops, in about the proportions set forth.

In testimony whereof I have signed my name to this specification in the presence of two subscribing witnesses.

EDWARD KOKOSINKI.

Witnesses:
    JOSEPH DEBAGE,
    ROBT. M. HOOPER.